United States Patent [19]

Swayze

[11] Patent Number: 5,040,627

[45] Date of Patent: Aug. 20, 1991

[54] MOUNTING APPARATUS FOR A BATTERY

[75] Inventor: L. Duane Swayze, Yorkville, Ill.

[73] Assignee: Caterpillar Inc., Peoria, Ill.

[21] Appl. No.: 538,050

[22] Filed: Jun. 14, 1990

[51] Int. Cl.$^5$ .......................................... B60R 16/04
[52] U.S. Cl. ................................. 180/68.5; 248/503; 429/99; 429/100; 105/51
[58] Field of Search ................... 180/68.5; 105/51; 224/42.38, 42.4, 902; 248/503; 429/96, 99, 100

[56] References Cited

U.S. PATENT DOCUMENTS

| | | | |
|---|---|---|---|
| 1,382,980 | 6/1921 | Hunt | 429/100 X |
| 2,022,595 | 11/1935 | Gowing | 180/68.5 X |
| 2,653,988 | 9/1953 | Rupp | 180/68.5 |
| 2,869,663 | 1/1959 | McDevitt | 180/68.5 |
| 2,918,983 | 12/1959 | Maitland et al. | 180/68.5 |
| 3,105,567 | 10/1963 | Schultz, Jr. | 429/100 X |
| 3,894,607 | 7/1975 | Brock | 180/68.5 |
| 3,991,844 | 11/1976 | Reynier | 429/100 X |
| 4,129,194 | 12/1978 | Hammond et al. | 180/68.5 |
| 4,535,863 | 8/1985 | Becker | 180/68.5 |
| 4,957,829 | 9/1990 | Holl | 429/100 |

FOREIGN PATENT DOCUMENTS 2015951 9/1979 United Kingdom .............. 180/68.5

Primary Examiner—Andres Kashnikow
Assistant Examiner—Brian L. Johnson
Attorney, Agent, or Firm—William C. Perry

[57] ABSTRACT

A mounting apparatus for a pair of batteries is provided that utilizes a centrally located fastener. The clamping force is spread over the entire upper surface of the batteries by a plurality of normally arcuate engagement surfaces that are defined by a non-metallic member. As the clamping force is increased during assembly, the engagement surfaces tend to flatten out, thus transferring the load over a larger area. The mounting apparatus also includes a cover member to protect the battery terminals and cable connections from damage due to incidental contact with tools and the like. The cover member is mounted separately from the battery mounting so as to be quickly removable for service without disturbing the mounting of the batteries.

21 Claims, 3 Drawing Sheets

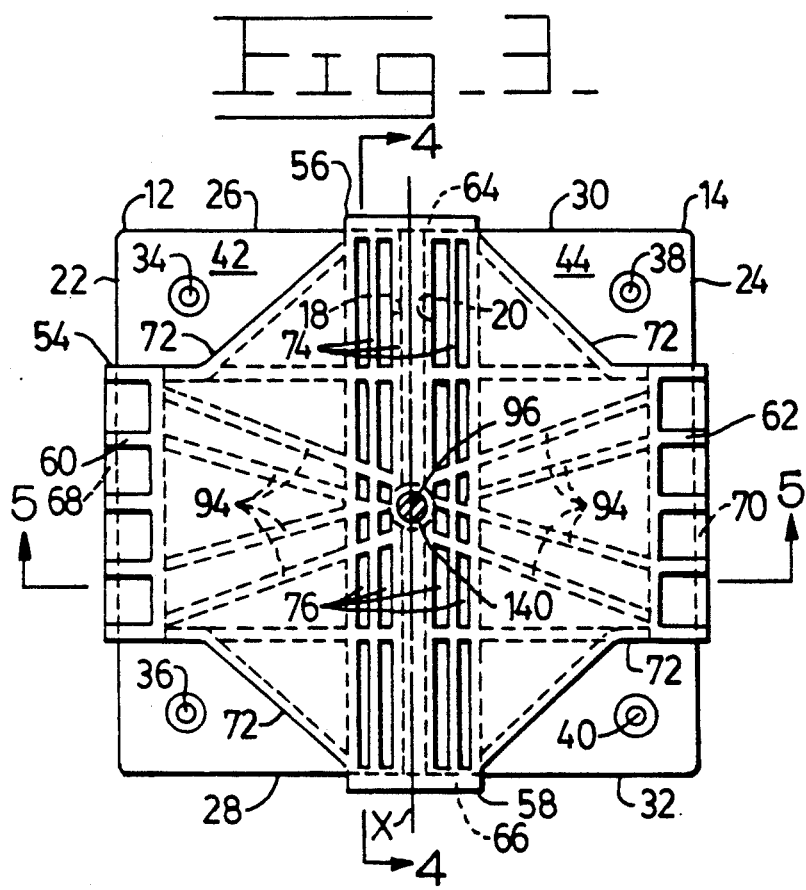

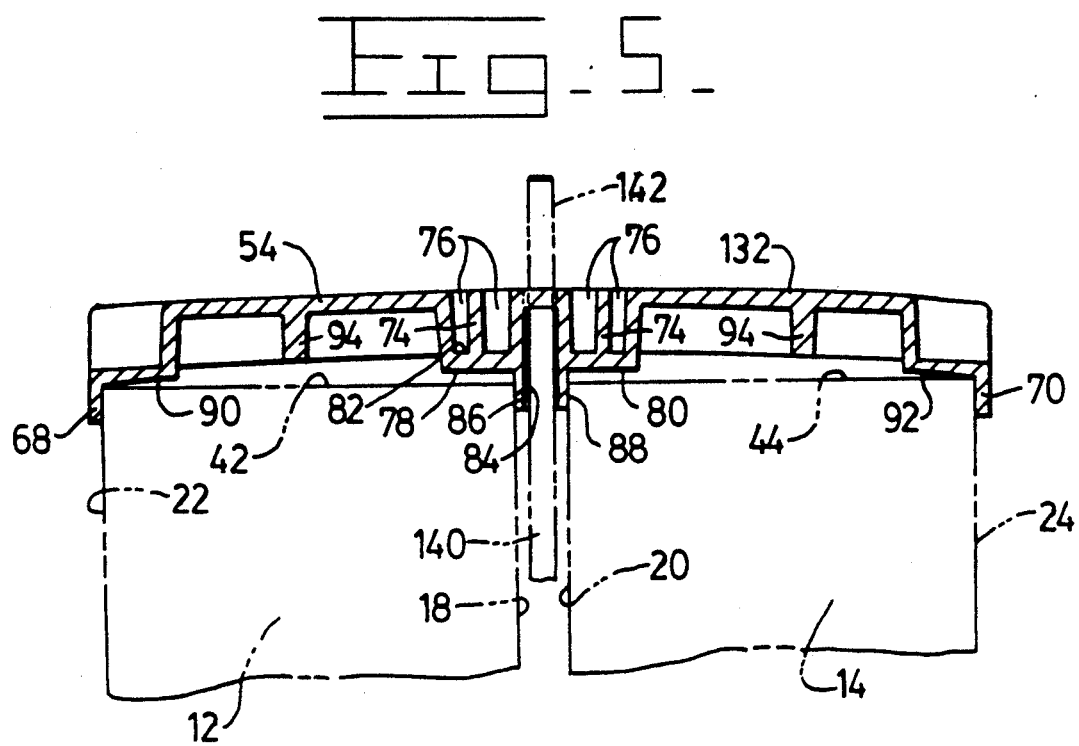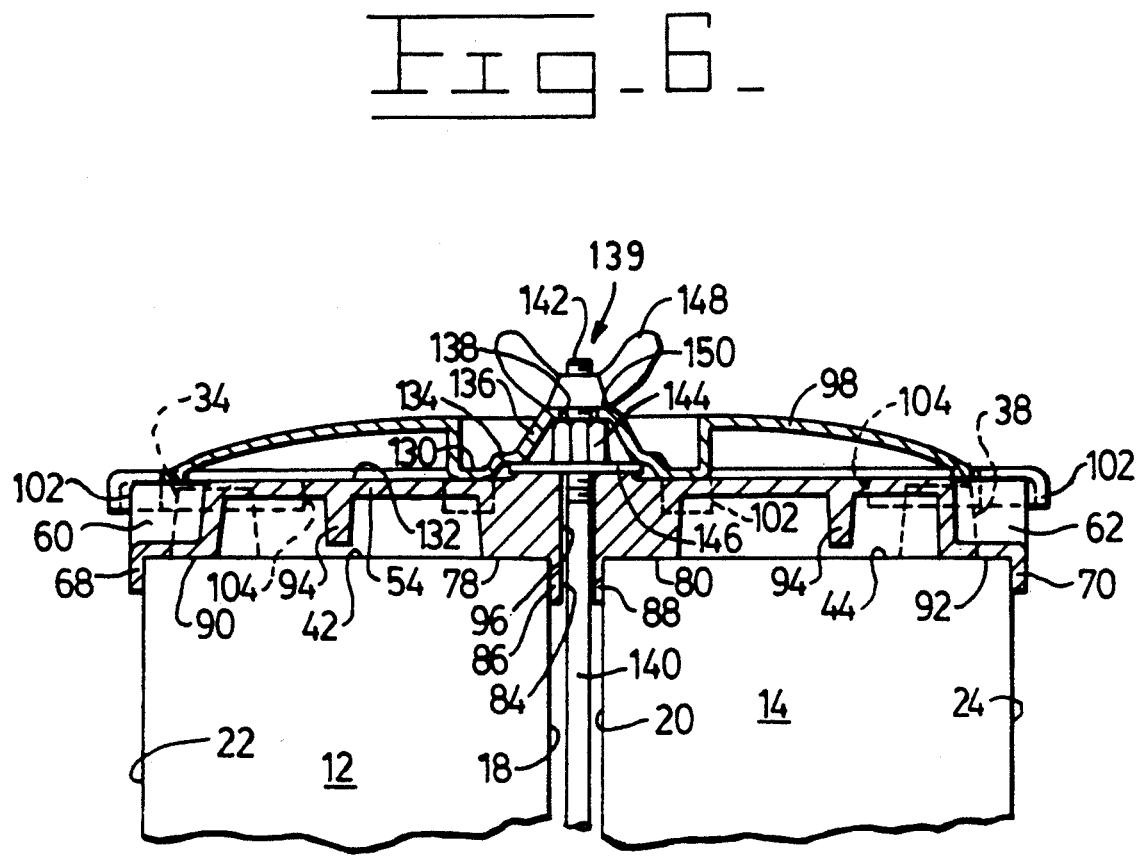

MOUNTING APPARATUS FOR A BATTERY

TECHNICAL FIELD

This invention relates generally to a mounting apparatus and more particularly to a mounting apparatus for one or more batteries.

BACKGROUND ART

In the automotive industry, there are numerous methods for securing batteries in position on a vehicle. In the construction industry, the electrical requirements to start the engine and maintain the operation of a vehicle often requires the use of two batteries used in tandem. Since construction vehicles are intended to be operated in extremely rough terrain from time to time, the hardware needed to secure the batteries in place is required to be of heavy duty capacity.

A typical mounting for a pair of batteries includes a metal frame member that rests on top of the batteries as they rest in place on a base plate. The frame typically surrounds the outer extremities of the battery and is secured to the base plate by numerous threaded fasteners that extend between the frame and the base plate. Usually at least two fasteners are spaced from each other at each end of the assembly to provide a clamping force against the batteries to hold them in place.

A design such as this is disclosed in the U.S. Pat. No. 4,129,194 issued on Dec. 12, 1978 to Howard A. Hammond et al. The disadvantages that exist in this and similar designs reside in the relative stiffness of the metal framework. Normally weight is an important factor in the design of the framework, as is accessibility to the batteries for service. If the framework is lightweight and therefore absent a significant amount of cross-bracing, it is often too flexible. Being flexible will allow the frame to deform under the torque of the mounting bolts. This can lead to overtightening of one or more of the mounting bolts which results in "point" loading on the battery case. This often causes the battery casing to crack during vehicle operation. This loading can be reduced by increasing the number of bolts used in the mounting apparatus, however the complexity and time required to assemble and disassemble the apparatus is greatly increased. Cross-bracing may be added to the structure for stiffness and to limit the flexibility of the frame, however this increases the weight and tends to limit the accessibility to the batteries.

An additional drawback is the presence of metal in and around the battery. Due to the corrosive nature of the sulfuric acid in the batteries, the corrosion of metal components is accelerated and has an extremely deleterious effect on the strength and function of the mounting components. Metal also is a good conductor of electricity and, when in contact with the battery, causes a "trickle" discharge of the battery and eventually results in battery failure. Often times the metal framework is dipped in plastic to alleviate these problems. While this does help to prevent corrosion and the discharge of the battery, the plastic material tends to "flow" under the clamping force initially provided by the fasteners. As times goes on and the apparatus is subject to shock and vibration, the mounting hardware can become loosened and the batteries will work free.

Another type of mounting for a battery is disclosed in U.S. Pat. No. 3,894,607, issued on July 15, 1975 to James E. Brock. This patent discloses a pair of batteries that are held in place by a single fastening means. The fastening means includes a nut that engages a threaded rod that extends upwardly between the two batteries. A pair of bearing members extend between the nut and the inner edges of the batteries to transmit and spread the torque of the nut along a substantial length of the batteries. While this mounting structure is simple in design, it must be noted that the battery terminals and associated cable clamps are left exposed to the environment. This can be a problem especially in an engine compartment wherein the use of various tools are required for repair and maintenance. Since the pair of batteries are mounted in side-by-side relation to each other, they form a natural shelf. It is very common for service personnel to place tools on top of the batteries for storage while working. With the battery terminals being exposed as they are, it is very possible for one or more tools to come into contact with two of the battery terminals and cause a discharge of electricity between them. In addition to causing damage to the batteries, it may create a dangerous situation for the serviceman.

The present invention is directed to overcoming one or more of the problems as set forth above.

DISCLOSURE OF THE INVENTION

In one aspect of the invention, a mounting apparatus for at least one battery is provided. The apparatus includes a base and a bracket member that has a plurality of engagement surfaces formed thereon. A means for mounting the bracket member to the base is provided and is utilized to secure the position of the battery. The mounting means is structured to urge the bracket means between a first position wherein the engagement surfaces are generally concave and a second position wherein the engagement surfaces are substantially flat and are fully engaged with the battery.

With a mounting apparatus as set forth above, one or more batteries may be mounted to a vehicle or the like in a very simple and effective manner. Since the mounting bracket is provided with engagement surfaces that are concave in their free state, they tend to flatten upon loading. In doing so, the load from the mounting means is spread out over the entire area of contact between the bracket member and the battery. Localized loading of the battery casing by the mounting means is thus avoided and the possibility of fracture of the battery case is greatly reduced.

In another aspect of the invention, a mounting apparatus for a pair of batteries is provided. It includes a base for supporting the batteries in side-by-side relation to each other such that the batteries define inner and outer longitudinally directed engagement surfaces on the upper surface of each battery. A bracket member is provided that has a centrally disposed aperture extending through it and further defines a plurality of longitudinally directed, generally concave, engagement surfaces. The bracket member is positionable on the batteries with its engagement surfaces adjacent the engagement surfaces defined by the batteries. A threaded rod member is connected to the base and extends upwardly therefrom so as to be positioned between the batteries. A fastening means is provided that is engageable with the threaded rod member and an upper surface of the bracket member. The fastening means is rotatable with respect to the threaded rod member and serves to affect the movement of the bracket member between a first and second position. In the first position, a peripheral portion of the engagement surfaces of the bracket member is in contact with the engagement surfaces of the batteries, while in the second position the engagement surfaces of the bracket member and the batteries are in full engagement with each other.

BRIEF DESCRIPTION OF THE DRAWINGS

FIG. 3 is a diagrammatic, fragmentary sectional view taken along lines 3—3 of FIG. 1 and illustrates the position of the respective batteries with the battery cables removed;

FIG. 4 is a diagrammatic fragmentary sectional view taken along lines 4—4 of FIG. 3 showing the mounting apparatus in an unassembled condition;

FIG. 5 is a diagrammatic sectional view similar to FIG. 4 and taken along lines 5—5 of FIG. 3; and FIG. 6 is a diagrammatic fragmentary sectional view taken along lines 6—6 of FIG. 2.

Figure 1:
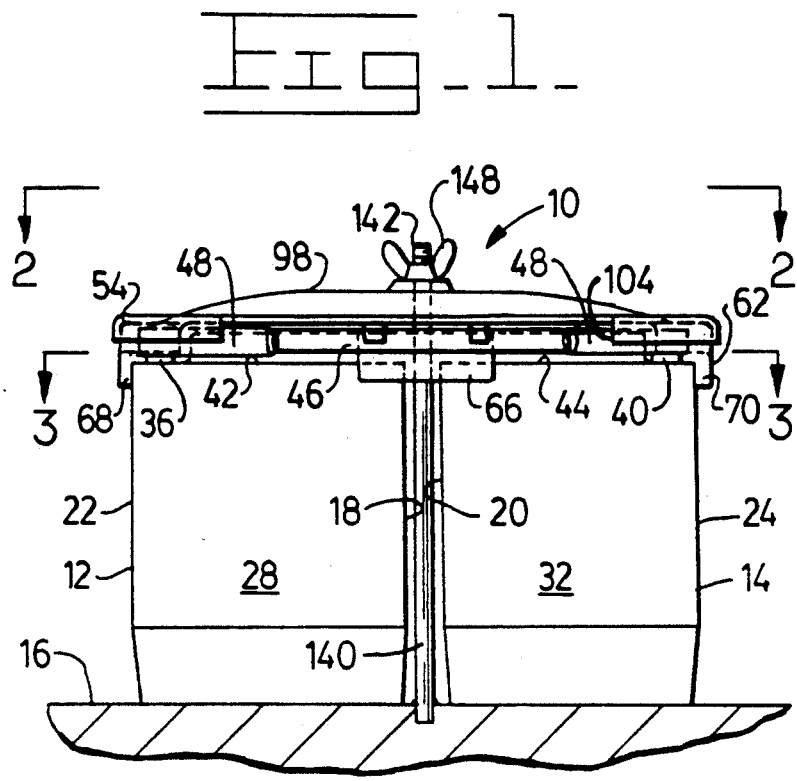
FIG. 1 is a diagrammatic end view of a mounting apparatus for a pair of batteries that embodies the principles of the present invention.

DETAILED DESCRIPTION OF THE DRAWING FIGURES AND BEST MODE FOR CARRYING OUT THE INVENTION

Figure 2:
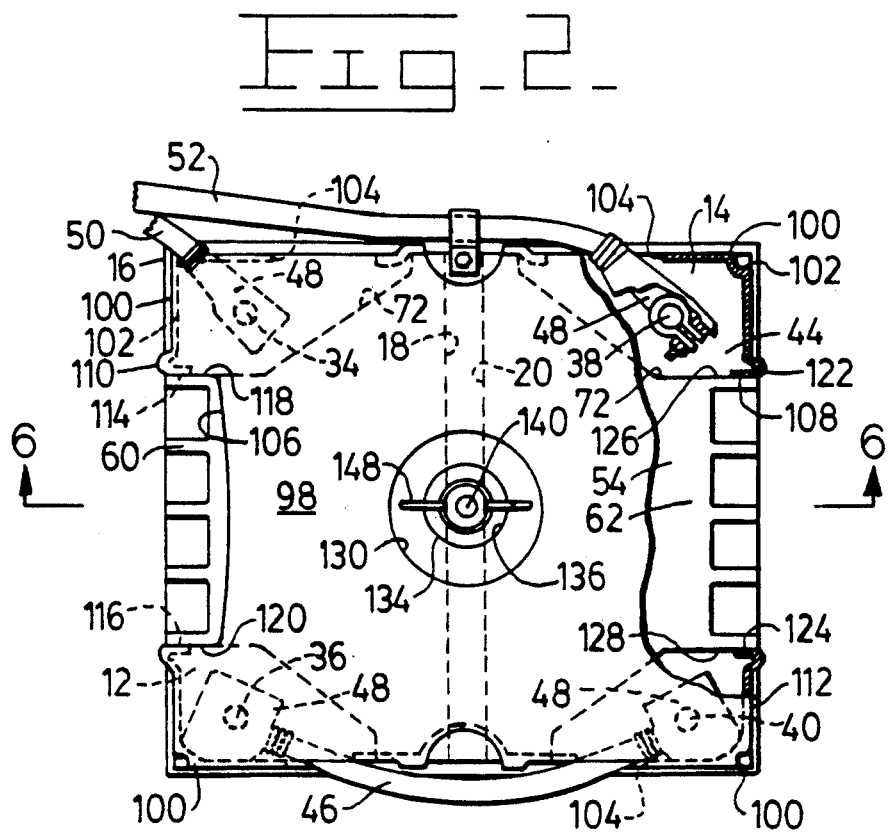
FIG. 2 is a diagrammatic top view of the mounting apparatus shown in elevation as viewed along lines 2—2 of FIG. 1.

Referring to the drawings and more particularly to FIGS. 1 and 2, a mounting apparatus, indicated generally at 10, is disclosed for mounting a pair of batteries 12 and 14. The batteries 12 and 14 rest in side-by-side relation on a base on frame 16. The batteries each define an inner sidewall 18 and 20 that face each other when the batteries are mounted to the base 16 and an outer sidewall 22 and 24. Also, each battery defines a pair of end walls 26, 28, 30 and 32 respectively. Battery terminals 34, 36, 38 and 40 extend from a top surface 42 and 44 of the respective batteries 12 and 14. Since the batteries are connected in series, a first cable 46 extends between the terminals 36 and 40 of the batteries and is secured to each terminal by a clamping device 48 of a well-known design. A second cable 50 (FIG. 2) is attached to the terminal 34 of battery 12 by a clamp 48 and communicates electricity with the various vehicle systems (not shown). A third cable 52 is attached to the terminal 38 of battery 14 by another clamp 48 and is in turn connected to a suitable ground (not shown).

A bracket member 54 is placed in overlying relation to the upper surfaces 42 and 44 of each battery 12 and 14. As is best shown in FIG. 3, the bracket is generally cross-shaped in configuration and defines a first pair of arms 56 and 58 that extend in a first or longitudinal direction with respect to the batteries. A second pair of arms 60 and 62 is defined by the bracket and extends in a second, lateral direction that is normal to the first. Each arm defines a vertically oriented flange 64, 66, 68 and 70. Flanges 64 and 66 extend downwardly from the first pair of arms 56 and 58 to engage the end walls 26, 30, 28, 32 of the respective batteries, while flanges 68 and 70 extend downwardly from the second pair of arms 60 and 62 to engage the respective outer walls 22 and 24 of the respective batteries 12 and 14. Positioned between each arm is a recess or cutout 72 that receives one of the respective battery terminals 34, 36, 38 and 40 when the bracket is positioned on top of the batteries.

A first plurality of reinforcing ribs 74 are integrally formed along the longitudinal centerline of the bracket member 54 and extend the length between the first pair of arms 56 and 58 (FIG. 3). The ribs form a plurality of upwardly open channels 76 that serve to strengthen the bracket in the longitudinal direction and to evenly transfer force as will be described hereinafter. A first pair of engagement surfaces 78 and 80 are positioned on a lower surface 82 of the channels. The engagement surfaces 78 and 80 are spaced from each other on opposite sides of the longitudinal centerline (X) and extend the full distance between the first pair of arms 56 and 58. A downwardly open channel 84 is formed between the engagement surfaces 78 and 80. The channel further defines an extension or locating rib 86 and 88 that protrudes downwardly beyond the respective engagement surfaces 78 and 80 and is joined therewith. The locating ribs 86 and 88 are positioned between the batteries 12 and 14 when the bracket is mounted thereon and are engageable with the inner sidewalls 18 and 20 of the batteries to properly locate and align the assembly. A second pair of engagement surfaces 90 and 92 are formed on the bracket member 54 and are positioned in inwardly adjacent relation to the vertically oriented flanges 68 and 70 of the second pair of arms 60 and 62 respectively. All of the engagement surfaces 78, 80, 90 and 92 are oriented in parallel relation to the longitudinal centerline (x) of the bracket member 54. As is best shown in FIG. 4, the first pair of engagement surfaces 78 and 80 are generally arcuate or concave in configuration when the bracket is in an unassembled condition. The second pair of engagement surfaces 90 and 92 is also concave in configuration as can best be seen in FIG. 5. However, the arc or concavity defined by the second pair of engagement surfaces 90 and 92 extends in a direction that is normal to that of the first pair. Also, when viewing FIG. 5, it can be seen that the first pair of engagement surfaces 78 and 80 are positioned vertically above the second pair of engagement surfaces 90 and 92. While being substantially flat in this plane the first pair of engagement surfaces are located generally along a projected arc defined by the second pair of engagement surfaces.

A second plurality of reinforcing ribs 94 are integrally formed in the bracket member 54 and extend between the second pair of arms 60 and 62. These reinforcing ribs 94 are positioned at an angle with respect to both pairs of arms and generally diagonally oriented with respect to arms 60 and 62 (FIG. 3). An aperture 96 is formed through the bracket member 54 and is located within the channel 84 formed by the first plurality of reinforcing ribs at the center of the bracket member.

A cover member 98 is provided to be mounted on top of the bracket member 54 in overlying relation to the bracket member and the battery terminals 34, 36, 38 and 40 as can be seen in FIGS. 1, 2 and 6. As is best shown in FIG. 2, the cover is generally rectangular in configuration and forms a plurality of wing members 100 at each corner. A downwardly extending lip 102 borders each wing member 100 for at least a portion of the outer periphery thereof. The border is non-continuous to provide openings 104 that receive the respective battery cables 46, 50 and 52 when the cover member is mounted in place. The bordering lip 102 provides a certain amount of stiffness to allow it to support an ample amount of weight without collapsing while at the same time allowing the cover to be relatively deformable without cracking. The bordering lip 102 extends around the periphery of the wings 100 a distance sufficient to border at least a portion of a pair of recesses 106 and 108 defined on opposite sides 110 and 112 of the cover member 98. A pair of extensions 114 and 116 of the lip 102 border the recess 106 and engage opposing sides 118 and 120 of arm 60. Another pair of extensions 122 and 124 of the lip 102 border the recess 108 and engage opposite sides 126 and 128 of arm 62.

The cover member 98 defines a central portion that includes a plurality of concentric annular portions (FIG. 6). A first portion 130 is engaged with an upper surface 132 of the bracket member 54 and provides rigidity to the cover in the central portion thereof. A second annular portion 134 is raised slightly from the first and has a diameter that is slightly less than that of the first annular portion 130. A third annular portion 136 extends upwardly from the second annular portion 134 and has a diameter reduced from that of the second annular portion. An aperture 138 is formed through the cover 98 and opens onto the third annular portion 136. The aperture is centered with respect to the concentric annular portions and the overall cover member itself.

A mounting means 139 engages both the cover member 98 and the bracket 54 to secure them to the base 16. A rod member 140 is secured to the base 16 by any one of several well known methods such as welding (FIG. 1). The rod is threaded along a distal portion 142 thereof and is centrally located with respect to the base 16. The rod 140 is located so as to extend upwardly from the base to a position between batteries 12 and 14. The rod sufficiently sized to be received within the aperture 96 of the bracket member 54.

A first fastening means 144 is threadably engageable with the rod member 140 and bears against a washer 146 that is positioned about the rod and rests upon the upper surface 132 of the bracket member 54. The first fastening means 144 is in the form of a common threaded nut and serves to secure the bracket member 54 to the base 16. The rod member 140 is also sufficiently sized to be received within the aperture 138 of the cover member 98. A second fastening means in the form of a wing nut 148, is also threadably engaged with the rod member 140. The wing nut 148 bears against an upper surface 150 of the cover member 98 to capture the cover member between the first and second fastening means 144 and 148 to secure the cover member 98 to the bracket member 54 and complete the assembly.

INDUSTRIAL APPLICABILITY

When it is desirable to mount the batteries 12 and 14 to the base 16, they are positioned on the base with the rod member 140 extending upwardly between the inner sidewalls 18 and 20 of the batteries. The bracket member 54 is placed on top of the batteries with the rod member 140 extending through the aperture 96 in the bracket. The bracket is positioned on the top surface 42 and 44 of the batteries so that the locating ribs 86 and 88 extend down between the batteries so as to engage the respective inner sidewalls 18 and 20 of the batteries. At the same time, the vertically oriented flanges 64, 66, 68 and 70 defined by the respective arms 56, 58, 60 and 62 are engaged with the outer extremities of the batteries. The batteries are held from relative movement in a longitudinal direction through engagement with flanges 64 and 66. Flange 64 engages the aligned end walls 26 and 30 of the batteries 12 and 14 while flange 66 engages the aligned end walls 28 and 32. Relative movement in a lateral direction is prevented by flanges 68 and 70 which engage the respective outer sidewalls 22 and 24. As can be seen best in FIG. 4, the engagement surfaces 78 and 80 are in their unassembled, concave position and are only in contact with the batteries in the area adjacent flanges 64 and 66. Similarly, it can be seen when viewing FIG. 5, that the engagement surfaces 90 and 92 are engaged with the respective upper surfaces 42 and 44 of the batteries at a point closely adjacent flanges 68 and 70 and are slightly spaced therefrom along the innermost edges of the engagement surfaces 90 and 92 when the bracket is in its unassembled state. As the first engagement means, nut 144, is threaded onto the rod member 140, the rotational force urges all the engagement surfaces 78, 80, 90 and 92 of the bracket member 54 toward engagement with the upper surfaces 42 and 44 of the batteries. As the rotation of nut 144 continues, the configuration of the engagement surfaces tends to flatten out until the entire length of each engagement surface contacts the upper surface of each battery (FIG. 6).

After the nut 144 is sufficiently tightened against the washer 146 and bracket member 54 to secure the batteries 12 and 14 to the base 16, the cover member 98 may be fastened in place. The cover 98 is then positioned over the bracket member 54 with the rod member 140 extending through the aperture 138. The cover is positioned with respect to the bracket member so that the recesses 106 and 108 are placed over the respective arms 60 and 62 of the bracket member. The extensions 114 and 116 of the lip 102 are brought into engagement with the respective sides 118 and 120 of arm 60 while the extensions 122 and 124 of lip 102 are engaged with sides 126 and 128 of arm 62. In this position, the wing members 100 are placed in overlying relation to the respective terminals 34, 36, 38 and 40. Also, in this position, the first annular portion 130 will be placed in resting engagement with the upper surface 132 of the bracket member 54. The second annular portion 134 is upraised from the surface of the bracket member an amount to accommodate the thickness of the washer 146. The third annular portion 136 is upraised from the second annular portion 134 an amount sufficient to accommodate the nut 144. The wing nut 148 is then threaded onto the rod member 140 until it contacts the cover member 98 to sandwich the cover member against the nut 144.

The mounting apparatus 10 as set forth above provides a mechanism for securing a pair of batteries 12 and 14 to a base 16 in a manner that is accomplished in a quick and easy manner with a minimum of hardware. Because of the concavity of the engagement surfaces 78, 80, 90 and 92, the entire force from the single fastening means 144 for the bracket member 54 is evenly distributed over the upper surfaces 42 and 44 of each battery. This force distribution is aided by the reinforcing ribs 74 and 94 that are integrally formed in the bracket member 54. A uniform transfer of force created by the torque of the nut 144 prevents a concentration of force on one portion of the battery casing which could otherwise cause the casing to fracture.

The subject mounting apparatus 10 also provides an optional cover 98 for the battery terminals 34, 36, 38 and 40 and their associated clamping hardware 48. The cover provides a safe place for tools to be temporarily placed without risk of damaging the terminals through incidental contact with the tools or through cross-connection between the terminals and subsequent inadvertent discharge of the batteries. The cover also protects the terminals and associated clamps from any inadvertent spillage of liquids on the upper surfaces 42 and 44 of the batteries 12 and 14. When it is necessary to service the batteries, for instance when charging is required, access to only two terminals is required since the batteries are connected in series. This is accomplished by loosening a single wing nut 148 and rotating the cover 45° with respect to member 54 to bring the two recesses 106 and 108 into registry with any two diagonally opposed battery terminals. This exposes the terminals and their associated clamping hardware without having to completely remove the cover. Since the cover fastener 148 is separate from that which mounts the bracket member 54, the mounting of the batteries need not be disturbed.

Other aspects, objects and advantages of this invention can be obtained from a study of the drawings, the disclosure and the appended claims.

I claim:

1. A mounting apparatus adapted for mounting a pair of batteries having a plurality of terminals defined on an upper surface thereof to a base, comprising:

a bracket member having a cross-shaped configuration that defines four arm positions which are arranged to form a first and a second pair of opposing arms that are positioned in normal relation to each other, each of said pair of opposing arms further defining a first and second pair of engagement surfaces that are generally arcuate in configuration; and means for mounting the bracket member to the base to secure the batteries therebetween, said mounting means being engaged with the bracket member at a location that is centrally disposed on the bracket member with respect to said four arm portions to urge the bracket member between a first position wherein the engagement surfaces maintain their arcuate configuration and are in partial engagement with the batteries and a second position wherein the engagement surfaces are substantially flat and are fully engaged with the batteries.

2. The mounting apparatus as set forth in claim 1 wherein the bracket member further defines a centrally disposed aperture that extends therethrough and a vertically oriented flange that is positioned on each of said four arm portions, each of said vertical flanges being engaged with a selected one of an outer extremity defined by each of said batteries.

3. The mounting apparatus as set forth in claim 1, wherein the bracket member defines a recess between each of the four arm portions, each of said recesses being positioned adjacent one of said plurality of battery terminals to leave said terminals exposed when the bracket member is in said second position.

4. The mounting apparatus as set forth in claim 1 wherein the first pair of engagement surfaces is defined on a first plurality of reinforcing ribs that are integrally formed on the bracket member and extend between the first opposing pair of said arms.

5. The mounting apparatus as set forth in claim 2 wherein the second pair of engagement surfaces is formed in inwardly adjacent relation to the vertical flanges formed on the second opposing pair of said arms.

6. The mounting apparatus as set forth in claim 1 wherein the arc of the first pair of engagement surfaces extends in a direction that is parallel to a longitudinal centerline defined by the bracket member and the arc of the second pair of engagement surfaces extends in a direction that is normal thereto, said engagement surfaces being fully engageable with the upper surfaces of the respective batteries only when the bracket member is in said second position.

7. The mounting apparatus as set forth in claim 1 wherein a second plurality of reinforcing ribs are integrally formed in the bracket member and are positioned to extend toward the second pair of opposing arms in a generally diagonal orientation.

8. The mounting apparatus as set forth in claim 6 wherein the first plurality of reinforcing ribs further define a pair of downwardly extending locating ribs that are positioned on opposite sides of the longitudinal centerline and engage a substantial portion of the length of each battery to locate and secure the batteries with respect to the base.

9. The mounting arrangement as set forth in claim 2 wherein the mounting means further includes:

a threaded rod member that is secured to the base and extends upwardly therefrom so as to be received within the aperture of the bracket member; and a first threaded fastener threadably engaged with said rod member and the bracket member in such a manner as to move the bracket member from said first position to said second position upon rotation of the first fastener with respect to the rod member.

10. The mounting apparatus as set forth in claim 9 wherein a cover member is provided, said cover member being generally rectangular in configuration and defining a wing member at each corner thereof and at least a pair of recesses on opposite sides of the cover member, said cover member being positioned in overlying relationship to the bracket member in a manner wherein at least one pair of arms of the bracket member are received within the recesses of the cover member to locate the cover member such that the wing members are positioned in overlying relation to each of the respective battery terminals.

11. The mounting apparatus as set forth in claim 10 wherein the cover member further includes a centrally disposed aperture that receives the threaded rod member therethrough and a secondary fastening member that engages the threaded rod member to secure the cover member to the bracket member.

12. A mounting apparatus for a pair of batteries comprising:

a base for supporting the batteries in side-by-side relation to each other, each battery defining an inner and outer sidewall, a pair of endwalls and an upper surface;

a bracket member having a centrally disposed aperture formed therethrough and a first and second pair of longitudinally directed, generally arcuate, engagement surfaces said bracket member being positioned on said batteries with the engagement surfaces in contact with the upper surfaces of the batteries adjacent the inner and outer sidewalls thereof;

a threaded rod member connected to the base member that extends upwardly therefrom so as to be positioned between the batteries;

a fastening means threadably engaged with the threaded rod member and being rotatable with respect to the threaded rod member to move axially therealong into abutting engagement with an upper surface of the bracket member to effect the movement of the bracket member between a first position wherein a peripheral portion of the engagement surfaces of the bracket member is in contact with the upper surface of the batteries and a second position wherein the engagement surfaces of the bracket member are fully engaged with the upper surfaces of the batteries substantially along their entire length.

13. The mounting apparatus as set forth in claim 12 wherein the bracket member defines a first pair of arms that are formed on opposite sides of the bracket member and extend in a longitudinal direction with respect to the batteries and a second pair of arms that are formed on opposite sides of the bracket member and extend in a direction that is normal to said first pair of arms.

14. The mounting apparatus as set forth in claim 13 wherein a downwardly extending flange is formed on an end of each arm and to engage one of a side and end portion of the respective batteries.

15. The mounting apparatus as set forth in claim 13 wherein the first pair of arms formed by the bracket member further defines a pair of downwardly extending locating ribs that engage an inner side of each battery to locate the bracket member and the batteries with respect to the base.

16. The mounting apparatus as set forth in claim 12 wherein the first pair of engagement surfaces are arcuate in a longitudinal direction, each of the respective first engagement surfaces being positioned for engagement with the upper surfaces of the respective batteries at a location adjacent the inner sidewalls of the respective batteries and the second pair of engagement surfaces being arcuate in configuration and positioned to extend in a direction normal to that of the first pair of engagement surfaces to engage the upper surface of the respective batteries at a location adjacent the outer sidewalls thereof.

17. The mounting apparatus as set forth in claim 12 wherein each battery defines a pair of terminals on the upper surface thereof, said terminals being of a construction sufficient for connection with a terminal clamping apparatus.

18. The mounting apparatus as set forth in claim 17 wherein the bracket member includes a recess between each of said first and second pairs of arms said recesses being of sufficient size to receive one of the respective battery terminals and associated clamping apparatus within the confines of each recess so that said terminals and clamping apparatus are exposed when the bracket member is in said second position.

19. The mounting apparatus as set forth in claim 17 wherein a cover member having a plurality of wing members defined at the corners thereof and a centrally disposed aperture formed therethrough, is positioned in overlying relation to the bracket member and the batteries such that the wing members cover the terminals and clamping apparatus of the respective batteries and the threaded rod member is received within the aperture of the cover member.

20. The mounting apparatus as set forth in claim 19 wherein the cover member further defines a pair of recesses at least a portion of which is bordered by a downwardly extending lip, said recesses being positioned on opposite sides of the cover member so as to receive the second pair of arms defined by the bracket member therein with a downwardly extending lip engaged with an opposite side of the second pair of arms to locate the cover member with respect to the bracket member and the batteries.

21. The mounting apparatus as set forth in claim 19 wherein a second fastening means is provided and is engaged with the threaded rod member and the upper surface of the cover member to secure the cover member to the bracket member.

* * * * *